United States Patent
Kang (10) Patent No.: US 10,884,501 B2
(45) Date of Patent: Jan. 5, 2021

(54) DISPLAY DEVICE INCLUDING FORCE SENSOR AND METHOD OF MANUFACTURING SAME

(71) Applicant: LG Display Co., Ltd., Seoul (KR)

(72) Inventor: Jeonggoo Kang, Gwangju (KR)

(73) Assignee: LG Display Co., Ltd., Seoul (KR)

( * ) Notice: Subject to any disclaimer, the term of this patent is extended or adjusted under 35 U.S.C. 154(b) by 25 days.

(21) Appl. No.: 16/101,167

(22) Filed: Aug. 10, 2018

(65) Prior Publication Data

US 2019/0101988 A1    Apr. 4, 2019

(30) Foreign Application Priority Data

Sep. 29, 2017  (KR) .......................... 10-2017-0127080

(51) Int. Cl.
*G06F 3/01* (2006.01)
*G06F 3/0354* (2013.01)
*G06F 3/041* (2006.01)
*G06F 3/044* (2006.01)

(52) U.S. Cl.
CPC .......... *G06F 3/016* (2013.01); *G06F 3/03547* (2013.01); *G06F 3/044* (2013.01); *G06F 3/0416* (2013.01); *G06F 3/0412* (2013.01); *G06F 2203/04103* (2013.01); *G06F 2203/04105* (2013.01)

(58) Field of Classification Search
None
See application file for complete search history.

(56) References Cited

U.S. PATENT DOCUMENTS

| 9,041,662 | B2 | 5/2015 | Harris |
| 9,524,624 | B2 | 12/2016 | Rank et al. |
| 9,870,084 | B2 | 1/2018 | Kuroki |
| 10,026,276 | B2 | 7/2018 | Rank et al. |
| 10,108,268 | B2 | 10/2018 | Harris |
| 2008/0289887 | A1* | 11/2008 | Flint ..................... G06F 3/0414 178/18.03 |
| 2009/0243997 | A1 | 10/2009 | Tierling et al. |
| 2009/0284485 | A1* | 11/2009 | Colgate ................... G06F 3/016 345/173 |

(Continued)

FOREIGN PATENT DOCUMENTS

| GB | 2464117 A | 4/2010 |
| JP | 2011-527791 A | 11/2011 |

(Continued)

OTHER PUBLICATIONS

Office Action, Japanese Patent Application No. 2018-174534, dated Aug. 1, 2019, 8 pages.

(Continued)

*Primary Examiner* — Christopher R Lamb
(74) *Attorney, Agent, or Firm* — Fenwick & West LLP (57) ABSTRACT

The present embodiments provide a display device including a display panel; an actuator configured to generate a predetermined vibration that is applied to the display panel; and a force sensor configured to sense force applied onto the display panel, the force sensor disposed on the display panel at a nodal point of the display panel that minimizes a portion of the sensed force resulting from the predetermined vibration generated by the actuator, and a method for manufacturing the same.

18 Claims, 9 Drawing Sheets

(56) References Cited

U.S. PATENT DOCUMENTS

| | | | |
|---|---|---|---|
| 2010/0245237 A1* | 9/2010 | Nakamura | A63F 13/02 345/156 |
| 2011/0090167 A1 | 4/2011 | Harris | |
| 2011/0278078 A1* | 11/2011 | Schediwy | G01L 1/146 178/18.06 |
| 2014/0002113 A1* | 1/2014 | Schediwy | G06F 3/044 324/661 |
| 2014/0167941 A1* | 6/2014 | Rank | G08B 6/00 340/407.1 |
| 2015/0084914 A1 | 3/2015 | Kuroki | |
| 2015/0277565 A1 | 10/2015 | Harris | |
| 2017/0084139 A1 | 3/2017 | Rank et al. | |
| 2017/0329408 A1 | 11/2017 | Harris | |
| 2018/0018036 A1* | 1/2018 | Huang | G06F 3/0414 |
| 2019/0066459 A1 | 2/2019 | Rank et al. | |

FOREIGN PATENT DOCUMENTS

| | | |
|---|---|---|
| JP | 2012-190475 A | 10/2012 |
| JP | 2013-156677 A | 8/2013 |
| JP | 2014-120170 A | 6/2014 |
| JP | 2015-215640 A | 12/2015 |
| WO | WO 2014/057593 A1 | 4/2014 |

OTHER PUBLICATIONS

Combined Search and Examination Report, United Kingdom Patent Application No. GB1815614.1, dated Mar. 13, 2019, 5 pages.

* cited by examiner

- - - - Nodal lines
○ Nodal points

DISPLAY DEVICE INCLUDING FORCE SENSOR AND METHOD OF MANUFACTURING SAME

CROSS REFERENCE TO RELATED APPLICATION

This application claims priority from Republic of Korea Patent Application No. 10-2017-0127080, filed on Sep. 29, 2017, which is hereby incorporated by reference in its entirety.

BACKGROUND

1. Field of Technology

The present embodiments relate to a display device including a force sensor and a method for manufacturing the same.

2. Description of the Prior Art

The development of the information society has brought about demands for various types of display devices for displaying images such as a liquid crystal display device (LCD), a plasma display device, an organic light-emitting display device (OLED), and the like.

The display devices can receive input signals using a mouse, a keyboard, a touch sensor, or the like. The touch sensor detects the touch position and enables execution of various applications according thereto. Touch sensors may be a resistive film type or a capacitive type. Recently, applications for performing various operations using touch force by means of a force sensor for detecting the touch force have been developed. Therefore, it is necessary to detect the touch force more accurately and to detect various strengths of the force.

In addition, a haptic technique that allows a user to feel an object by means of a tactile sense when a touch is performed and improves the accuracy of the touch may be applied to a display device. The haptic technique generates a vibration in the display panel when a touch is performed. However, when the haptic technique is applied to a display device, which has a force sensor, the force sensor provided in the display device may be affected by the vibration generated by the haptic function, so that the force sensor may not operate correctly.

SUMMARY

An aspect of the present embodiments is to provide a display device including a force sensor that is effectively disposed so as to reduce the influence of vibration noise caused by an actuator, and a method for manufacturing the same.

Another aspect of the present embodiments is to provide a method for manufacturing a display device including a force sensor, in which a force sensor can be simply disposed.

According to one aspect, the present embodiments may provide a display device including: a display panel; an actuator configured to generate a predetermined vibration that is applied to the display panel; and a force sensor configured to sense force applied onto the display panel, the force sensor disposed on the display panel at a nodal point of the display panel that minimizes a portion of the sensed force resulting from the predetermined vibration generated by the actuator.

According to another aspect, the present embodiments may provide a method for manufacturing a display device, the method comprising: selecting a mode and a frequency; transferring a vibration corresponding to the selected mode and frequency to a display panel identifying positions of a plurality of nodal points in the display panel, the plurality of nodal points having minimal vibration relative to other points of the display panel responsive to the transferred vibration; and; and disposing a plurality of force sensors at the plurality of nodal points.

According to the present embodiments, it is possible to provide a display device including a force sensor that is effectively disposed so as to reduce the influence of vibration noise caused by an actuator, and a method for manufacturing the same.

According to the present embodiments, it is possible to provide a method for manufacturing a display device including a force sensor, in which a force sensor can be simply disposed.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1:
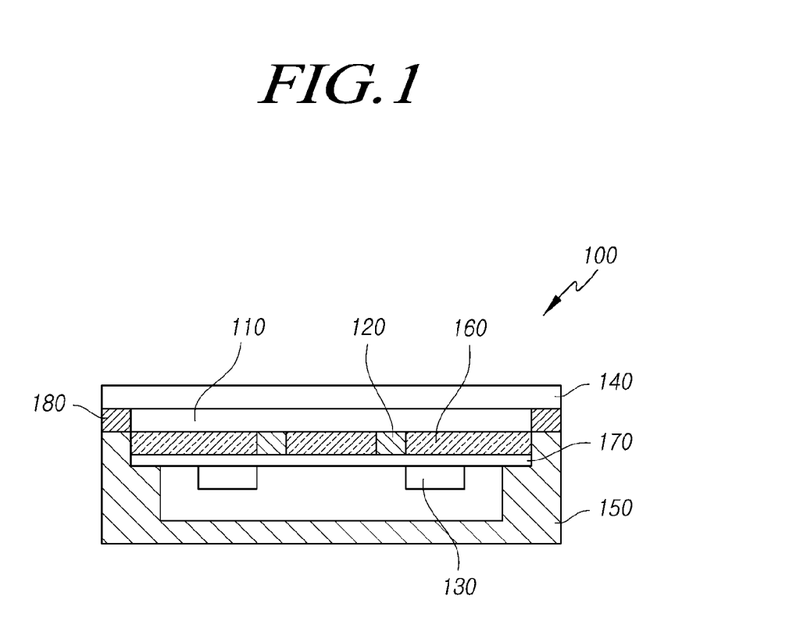
FIG. 1 is a cross-sectional view of a display device according to embodiments of the present disclosure.

FIG. 1 is a cross-sectional view of a display device according to embodiments of the present disclosure.

Referring to FIG. 1, a display device 100 may include a display panel 110, an actuator 130 that transfers vibration to the display panel 110, and one or more force sensors 120 disposed so as to correspond to a plurality of nodal points of the display panel 110 and so as to sense force applied to the display panel 110.

The display device 100 may also include a cover 140 disposed on the top of the display panel 110 and a back cover 150 disposed under the display panel 110. The back cover 150 may accommodate the display panel 110, the actuator 130, and the force sensors 120, and may protect the same from external impacts. In addition, the back cover 150 may be in contact with the edge of the display panel 110 so as to support the display panel 110. A pad 180 may be disposed on the edge of the display panel 110. The pad 180 may include a soft material so as to be pressed by touch force applied to the cover 140. The pad may be a material having elasticity. When the pad 180 is pressed, the cover 140 is pressed in the vertical direction by the force, and thus the force sensor 120 may sense the force generated by the touch. The cover 140 may come into contact with the back cover 150 at the edge thereof. The cover 140 may include a transparent material, such as glass, so as to allow light emitted from the display panel 110 to pass therethrough. The cover 140 may protect the display panel 110.

The actuator 130 may apply a predetermined vibration to the display panel 110. The actuator 130 may apply a vibration in response to a touch onto the display panel 110. The actuator 130 may vibrate the display panel 110 in response to a first frequency signal having a first frequency corresponding to the nodal point of the display panel 110 and a second frequency signal having a second frequency lower than the first frequency. The first frequency may be a frequency that a person cannot perceive, and the second frequency may be a frequency that a person can perceive. The second frequency may be a carrier wave for the first frequency. Accordingly, when the first frequency is transmitted by the second frequency, the user may recognize the vibration of the actuator 130 by means of the second frequency. The force sensors 120 may be disposed at the nodal points so as to minimize the influence of the vibration generated by the actuator 130. Although two actuators 130 for applying a vibration to the display panel 110 are shown in the drawing, the present disclosure is not limited thereto.

A lower plate 170 may be further disposed between the force sensors 120 and the actuators 130. The lower plate 170 may support the force sensors 120 such that the touch force onto the display panel 110 is transferred to the force sensors 120. The lower plate 170 may be supported by the back cover 150. In addition, a layer 160 may be disposed between the display panel 110 and the actuators 130, but in a same plane as the force sensors 120. In one embodiment, the layer 160 at least partially surrounds the force sensors 120. In addition, the layer 160 may be interposed between the display panel 110 and the lower plate 170. The layer 160 may not be disposed at the nodal points corresponding to the force sensors 120. The layer 160 may include a soft material so that the layer 160 may be pressed by the load of the display panel 110. The pad may be a material having elasticity. That is, the layer 160 may compress when force is applied to the display panel 110 during touch. When the layer 160 is pressed by the load of the display panel 110, the force sensors 120 support the load of the display panel 110, so that the force generated when touching the display panel 110 can be concentrated on the force sensors 120.

Figure 2:
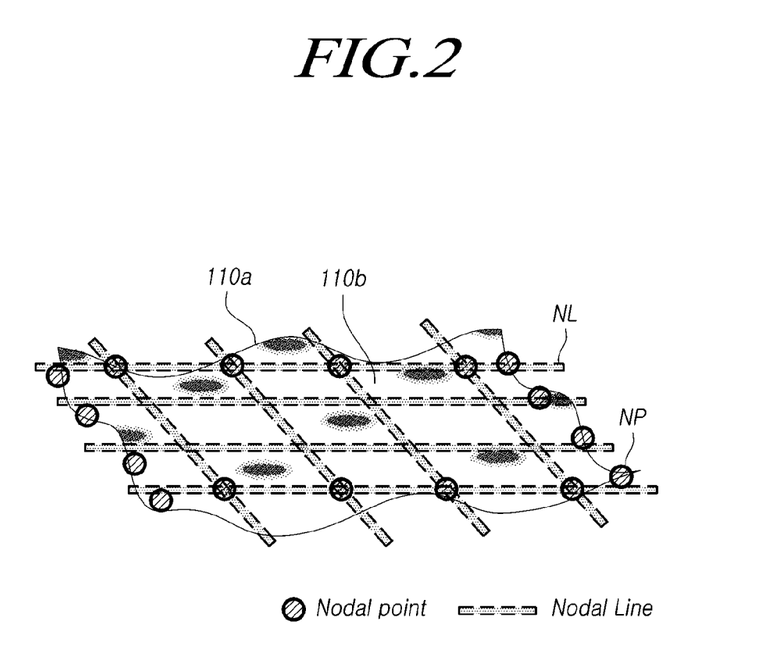
FIG. 2 is a conceptual diagram showing nodal lines and nodal points formed by vibrations applied to a display panel.

FIG. 2 is a conceptual diagram showing nodal lines and nodal points formed by a vibration applied to a display panel.

Referring to FIG. 2, the display panel 110 vibrates to correspond to a natural frequency. When a vibration having a predetermined frequency is applied to the display panel 110, the display panel 110 vibrates at a magnitude obtained by summating two frequencies. A vibrating surface 110a of the display panel 110 may vibrate constantly. At this time, there are points where the sum of two waves generated by the natural frequency of the display panel 110 and by the vibration of the actuator 130 is zero, which are referred to as a "nodal line." In addition, the points where the nodal lines intersect with each other may be referred to as "nodal points." The area corresponding to the nodal line may be referred to as a "nodal area." The area surrounded by the nodal lines may be referred to as a "non-nodal area" 110b. The non-nodal area 110b may be affected by the vibration of the actuator 130. That is, the non-nodal area 110B may vibrate due to the vibration of the actuator 130. When the force sensor 120 is disposed at the nodal point, no vibration generated by the actuator 130 affects the force sensor 120. That is, the influence of the vibration generated by the actuator 130 on the force sensed by the force sensor 120 is minimized by placing the force sensor 120 at the nodal point. Therefore, the force sensor 120 may accurately sense the force applied when a touch is performed. When the actuator 130 is disposed in the nodal area, the vibration generated by the actuator 130 may not be effectively transferred to the display panel 110, so that no vibration may be generated. Thus, the actuator 130 may be disposed in the non-nodal area 110b.

Figure 3:
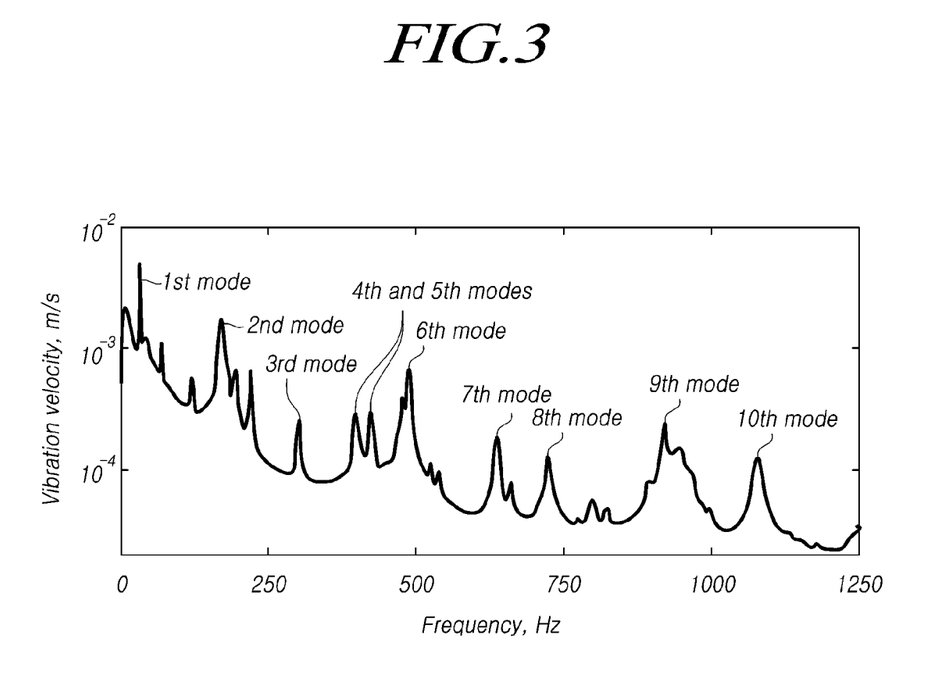
FIG. 3 is a graph showing a natural frequency of a display panel.

The nodal points may be found by an experimental method or by a method using structural analysis simulation. First, the experimental method includes impact hammer modal testing in which an instantaneous impact is applied directly to the display panel 110 to thus find nodal points, and shaker modal testing in which a vibration is applied to the display panel 110 to thus find nodal points. The method of finding nodal points through structural analysis simulation includes an analytical method of finding the value of the dominant differential equation representing a deformation-load relationship using a continuum model, and a numerical analysis method in which the values at respective nodes are numerically obtained by solving a matrix equation of a deformation-load relationship using a division model. In addition, the numerical analysis method may include a finite difference method, a finite element method, a boundary element method, mesh-free method, and the like. FIG. 3 is a graph showing the natural frequency of the display panel 110, and Table 1 is an experimental result obtained by performing a nodal test on the display panel 110.

The resonance points shown in FIG. 3 may be summarized as shown in Table 1 below.

TABLE 1

| | Model type | | | | |
|---|---|---|---|---|---|
| | $1^{st}$ | $2^{nd}$ | $3^{rd}$ | $4^{th}$ | $5^{th}$ |
| Frequency (Hz) | 34.375 | 173.4375 | 306.25 | 400.78125 | 425 |
| | Model type | | | | |
| | $6^{th}$ | $7^{th}$ | $8^{th}$ | $9^{th}$ | $10^{th}$ |
| Frequency (Hz) | 489.84375 | 640.625 | 727.34375 | 925.78125 | 1078.90625 |

When a vibration is applied using the frequencies corresponding to the $1^{st}$ to $10^{th}$ model types, the positions of the nodal lines in which no vibration occurs may be recognized in the display panel 110, and the positions of the nodal points may be obtained using intersections of the nodal lines. Although FIG. 3 and Table 1 show that the frequency corresponding to a resonance point is between 34.375 Hz and 1078.90625 Hz, the present disclosure is not limited thereto, and the resonance frequency corresponding to the resonance point may exist in the high frequency area beyond the above range. The actuator 130 may vary the frequency of the vibration so that a user may feel a variety of tactility corresponding to the vibration.

Figure 4A:
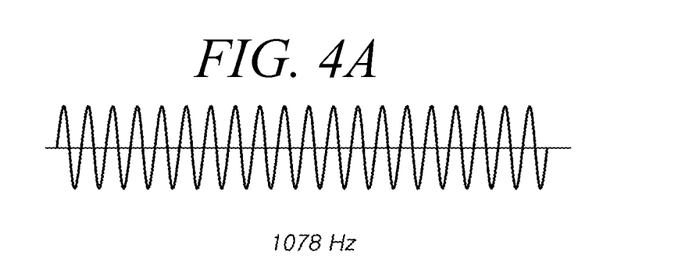
FIGS. 4A-4C are diagrams showing waveforms of a rendering signal using a resonance frequency and a carrier wave.
Figure 4B:
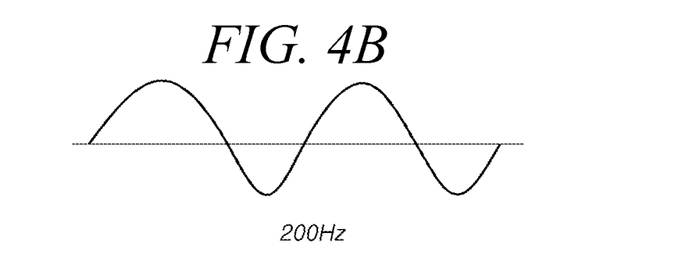
Figure 4C:
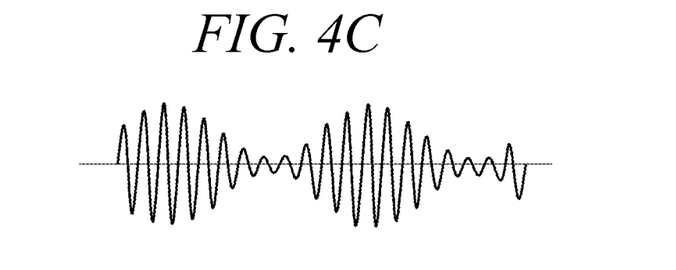

However, when the vibration frequency exceeds 1000 Hz, it is out of the human-perceivable range, so that the user may not feel the vibration. In order to solve this problem, a rendering signal may be generated using a carrier wave of a human-perceivable frequency, and the actuator 130 may output a vibration corresponding to the rendering signal. A vibration signal having a resonance frequency and a rendering signal using a carrier wave are shown in FIG. 4. FIG. 4A is a vibration signal obtained by selecting the frequency corresponding to the $10^{th}$ model type, and FIG. 4B is a carrier wave having a frequency that a person can perceive. The carrier wave may have a frequency of 200 Hz. Then, the vibration signal and the carrier wave may be calculated to generate a rendering signal shown in FIG. 4C. Although the amplitudes of the vibration signal and the carrier wave are the same in the drawing, the present disclosure is not limited thereto. The amplitude of the rendering signal may be determined to correspond to the amplitude of the carrier wave. The frequency of the carrier wave is not limited to 200 Hz, and the carrier wave may have a frequency in the range that can be perceived by a person. In addition, the frequency of the carrier wave may be between 180 and 250 Hz. The vibration signal may be referred to as a "first frequency signal," and the carrier wave may be referred to as a "second frequency signal."

Figure 5:
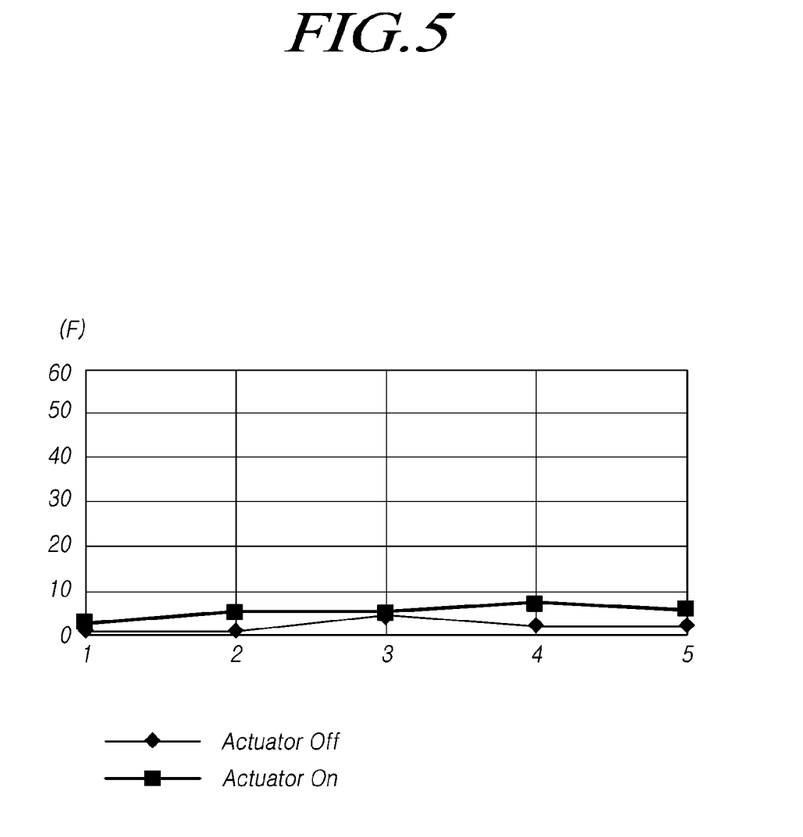
FIG. 5 is a graph showing the amount of change in the force sensed by a force sensor when the actuator is turned on and turned off in the embodiments of the present disclosure.

FIG. 5 is a graph showing the amount of change in the force sensed by a force sensor when the actuator is turned on and turned off in the embodiments of the present disclosure.

FIG. 5 shows the magnitude of the force sensed by the force sensor 120 when the actuator 130 is turned on and the magnitude of the force sensed by the force sensor 120 when the actuator 130 is turned off. The force sensor 120 is disposed at the nodal point of the display panel 110. The horizontal direction of the graph represents the lapse of time, and the magnitude of the force sensed by the force sensor 120 was measured five times at the same time interval. The vertical direction of the graph represents the magnitude of the force.

There were no big differences in the magnitude of the force between the case where the actuator 130 was turned on and the case where the actuator 130 was turned off all five times. Therefore, it can be seen that the force sensor 120 may operate correctly even if vibration occurs in the actuator 130 when the force sensor 120 is disposed at the nodal point.

Figure 6:
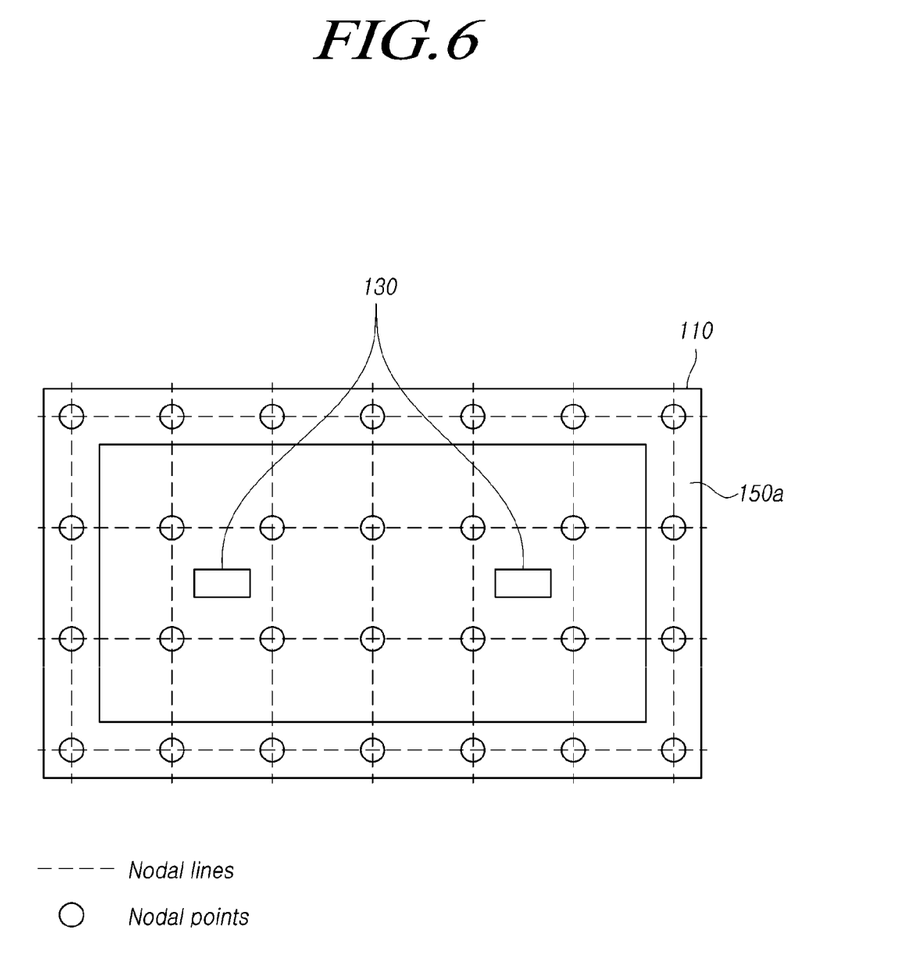
FIG. 6 is a plan view showing positions in which nodal points are formed in a display device according to embodiments of the present disclosure.

FIG. 6 is a plan view showing positions in which nodal points are formed in a display device according to embodiments of the present disclosure.

Referring to FIG. 6, the display device 100 may include a display panel 110 and an actuator 130 disposed at the lower portion of the display panel 110 so as to apply vibration. A back cover 150 may support the display panel 110 at the edge 150a thereof. Nodal lines (NL) are indicated by dotted lines and nodal points (NP) are indicated by circles. The number of nodal lines (NL) and the number of nodal points (NP) are illustrative, and the present disclosure is not limited thereto. The nodal points (NP) may be disposed in the center of the display panel 110, as well as at the edge of the display panel 110. Therefore, the force sensors 120 may also be disposed in the center of the display panel 110, as well as at the edge 150a of the display panel 110. In the case where the force sensors 120 are not disposed at the positions corresponding to the nodal points (NP), a structure for preventing the vibration generated by the actuator 130 from being transferred to the force sensors 120 is required. To this end, the force sensors 120 must be disposed at the edge 150a of the display panel 110, and must be fixed by the back cover 150. However, when the force sensors 120 are disposed at the nodal points (NP), the force sensors 120 may not be affected by the vibration of the actuator 130, so that the force sensors 120 can be disposed at various positions within the display panel 110. Therefore, the force sensors 120 may be disposed at the positions that are frequently touched and/or at the positions suitable for sensing the force, thereby disposing the force sensors 120 more efficiently.

Figure 7:
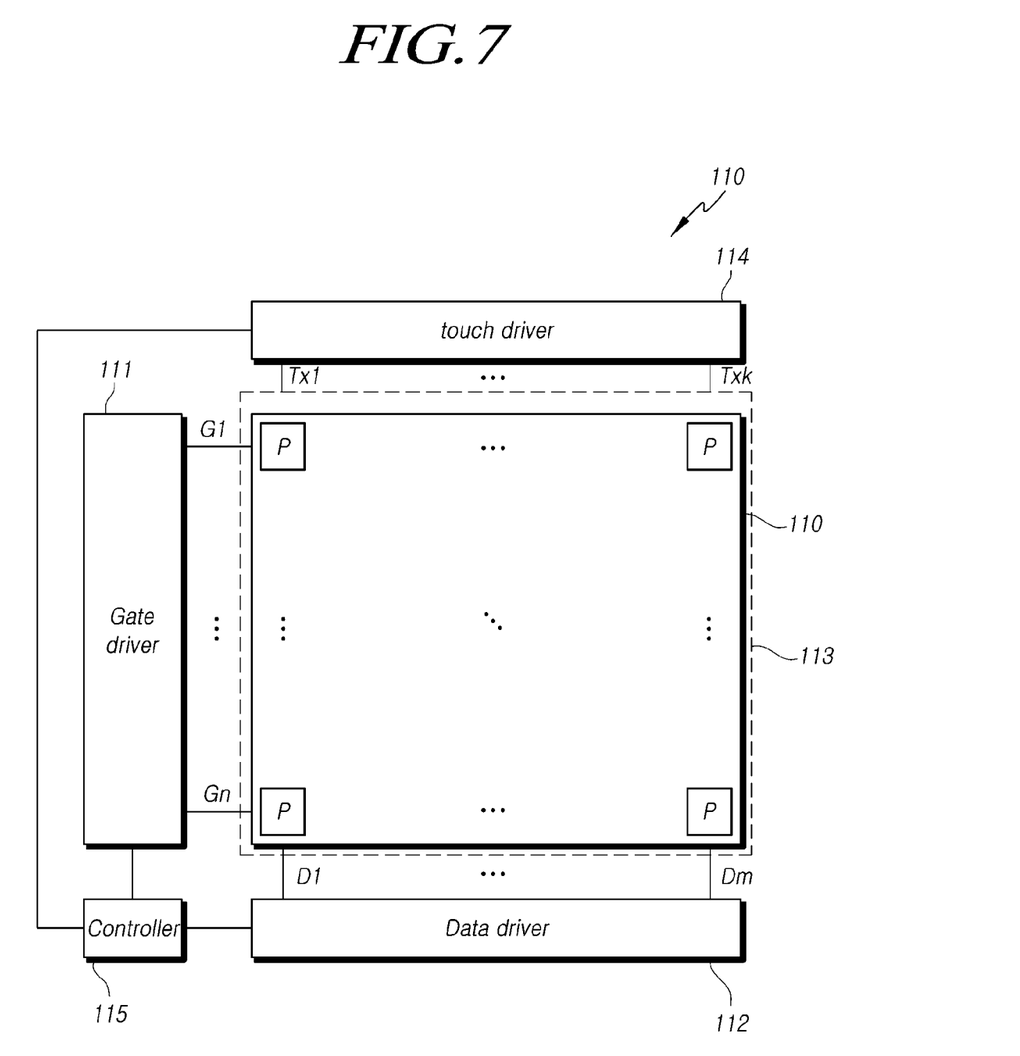
FIG. 7 is a structural diagram showing a display panel according to embodiments of the present disclosure.

FIG. 7 is a structural diagram showing a device according to embodiments of the present disclosure.

Referring to FIG. 7, a display device 200 may include a display panel 110, a gate driver 111, a data driver 112, a touch electrode 113, a touch driver 114, and a controller 115.

The display panel 110 may have a plurality of pixels (P) arranged to display an image. The display panel 110 may include a plurality of gate lines (G1 to Gn) and a plurality of data lines (D1 to Dm) disposed so as to intersect with each other. A plurality of pixels (P) may be disposed at the positions corresponding to intersections of the plurality of gate lines (G1 to Gn) and the plurality of data lines (D1 to Dm).

The gate driver 111 may be connected to the plurality of gate lines (G1 to Gn) so as to transmit gate signals to the gate lines (G1 to Gn). The data driver 112 may be connected to the plurality of data lines (D1 to Dm) so as to transmit data signals to the data lines. The gate signals may be sequentially transmitted to the plurality of gate lines (G1 to Gn), and the pixels (P) connected to the gate lines that have received the gate signals, among the plurality of gate lines (G1 to Gn), may receive data signals. Although a single gate driver 111 and a single data driver 112 are illustrated in the drawing, the present disclosure is not limited thereto, and a plurality of gate drivers and a plurality of data drivers may be implemented according to the resolution and/or size of the display panel 110. Although the gate driver 111 is illustrated as being disposed on one side of the display panel 110, the present disclosure is not limited thereto, and the gate driver 111 may be disposed on both sides of the display panel 110 such that gate signals are applied to odd-numbered gate lines and even-numbered gate lines, respectively. However, the present disclosure is not limited thereto.

The touch electrode 113 may be disposed on the display panel 110, and may output a sensing signal corresponding to a position where a user touches the display panel 110. In addition, the touch electrode 113 may be driven by receiving a touch driving signal. Although the structure of the touch electrode 113 is not shown in the drawing, the structure of the touch electrode 113 is well known to those skilled in the art. The touch electrode 113 may include a plurality of driving electrodes (not shown) and a plurality of sensing electrodes (not shown), which intersect with each other. In addition, the touch electrodes 113 may be configured as electrodes having a predetermined area and arranged in a matrix, and may receive a driving signal to thus output a sensing signal. In addition, the touch electrode may output a sensing signal in response to a change in the capacitance due to a touch in a capacitive type. The capacitive type includes a mutual-cap type and a self-cap type.

The touch driver 114 may transfer touch driving signals to the touch electrode 113 through touch driving signal lines (Tx1 to Txk). Although the touch driver 114 is illustrated as being connected to the touch electrode 113 through the touch driving signal lines (Tx1 to Txk) in the drawing, the present disclosure is not limited thereto, and the touch driver 114 may be connected to sensing signal lines that are connected to, and receive sensing signals from, the touch electrode 113. The touch driver 114 may transmit touch driving signals to the touch electrode 113 and receive sensing signals from the touch electrode 113 through the touch driving signal lines (Tx1 to Txk). In addition, the touch driver 114 may integrate the sensing signals to generate a capacitance change value, and may transmit the same to the controller 115. However, the present disclosure is not limited thereto.

The controller 115 may control the gate driver 111 and the data driver 112. The controller 115 may transmit an image signal to the data driver 112. The controller 115 may receive an image signal from an external device, and may correct the image signal to then transmit the corrected image signal to the data driver 112. The controller 115 may control the touch driver 114. The controller 115 may also control the actuator 130 shown in FIG. 1. Although the controller 115 is illustrated as a single block in the drawing, the present disclosure is not limited thereto, and the controller 115 may be divided into a plurality of blocks such as a block for controlling the gate driver 111 and the data driver 112, a block for controlling the touch driver 114, and a block for controlling the actuator 130.

The gate driver 111, the data driver 112, and the touch driver 114 may be disposed on a flexible printed circuit board (FPCB), and the controller 115 may be disposed on a printed circuit board (PCB).

In addition, the touch electrode 113 and the touch driver 114 may be referred to as a "touch sensor" for sensing touch coordinates. Alternatively, only the touch electrode 113 may be referred to as a "touch sensor". When the touch sensor senses a touch, the actuator 130 shown in FIG. 1 may generate a vibration. When the touch sensor senses a touch and transmits a result thereof to the controller 115, the controller 115 drives the actuator 130 to generate a vibration therefrom.

Figure 8:
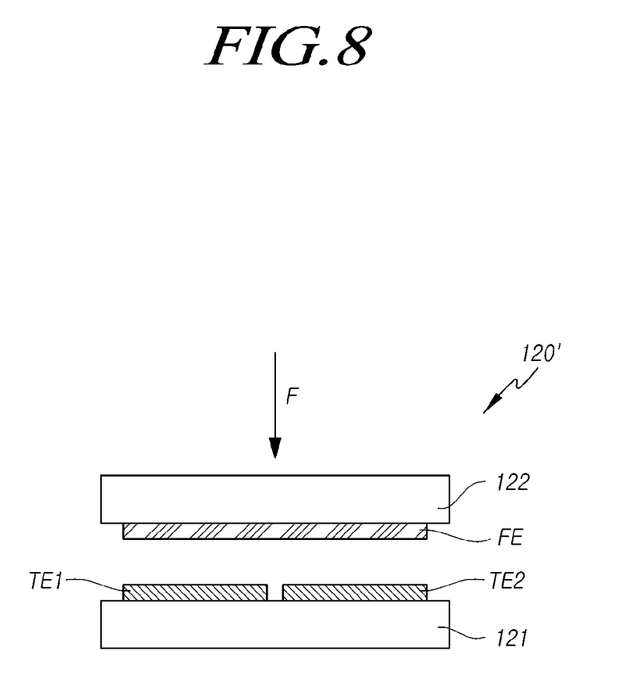
FIG. 8 is a cross-sectional view of a force sensor according to embodiments of the present disclosure.

FIG. 8 is a cross-sectional view of a force sensor according to embodiments of the present disclosure.

Referring to FIG. 8, the force sensor 120' may include a first electrode (TE1), a second electrode (TE2) spaced apart from the first electrode (TE1), and a force electrode (FE) spaced apart from the first electrode (TE1) and the second electrode (TE2) so as to come into contact with first electrode (TE1) and the second electrode (TE2) when force is applied in the first direction.

The first electrode (TE1) and the second electrode (TE2) may be disposed on a first substrate 121 that is placed on the lower plate 170. The first electrode (TE1) and the second electrode (TE2) may be separated from each other on the first substrate 121 such that they are not in contact with each other. The first electrode (TE1) may be a driving signal line through which a driving signal is transmitted, and the second electrode (TE2) may be a sensing signal line through which a sensing signal is transmitted. Alternatively, the first electrode (TE1) may be a line connected to a driving signal line, and the second electrode may be a line connected to a sensing signal line. The force electrode (FE) may be disposed above the first electrode (TE1) and the second electrode (TE2) so as to be spaced a predetermined distance apart therefrom. The force electrode (FE) may be formed on the second substrate 122. The force electrode (FE) may be formed on the surface of the second substrate 122, which faces the surface of the first substrate 121 on which the first electrode (TE1) and the second electrode (TE2) are disposed. The first substrate 121 and the second substrate 122 may be flexible substrates. The first substrate 121 and the second substrate 122 may include polyethylene terephthalate (PET). However, the present disclosure is not limited thereto.

The display panel 110 may be disposed on the second substrate 122. When a touch is generated by a user (that is, when a user touches the display panel 110 or the cover 140), the touch force is transmitted to the second substrate 122, and the second substrate 122 is pressed down by the force, so that the force electrode (FE) disposed on the second substrate 122 comes into contact with the first electrode (TE1) and the second electrode (TE2). When the force electrode (FE) comes into contact with the first electrode (TE1) and the second electrode (TE2), the first electrode (TE1) and the second electrode (TE2) may be electrically connected to each other by means of the force electrode (FE). As a result, a driving signal transmitted to the first electrode (TE1) may be transmitted to the second electrode (TE2), and a sensing signal in response to the driving signal may be transmitted through the second electrode (TE2). In this case, the contact area between the first and second electrodes (TE1) and (TE2) and the force electrode (FE) is determined to correspond to the magnitude of the force applied to the force electrode (FE), which makes a difference in the magnitude of resistance generated by first electrode (TE1) and the second electrode (TE2).

As the contact area between the force electrode (FE) and the first and second electrodes (TE1) and (TE2) increases, the magnitude of the resistance may be reduced. Therefore, the intensity of a sensing signal transmitted to the second electrode (TE2) may be determined corresponding to the magnitude of the resistance, and it is possible to detect the strength of the force applied when the touch is made by determining the magnitude of the resistance using the intensity of the signal.

The force sensor 120' shown in the drawing may be the force sensor 120 shown in FIG. 1. Alternatively, the first substrate 121 of the force sensor 120' and the first and second electrodes (TE1) and (TE2) disposed on the first substrate 121 may be the force sensor 120 shown in FIG. 1. In the case where the first substrate 121, the first electrode (TE1), and the second electrode (TE2) correspond to the force sensor 120 shown in FIG. 1, the second substrate 122 and the force electrode (FE) may be formed over the entire area of the display panel 110, and the first substrate 121 may be disposed at the nodal point.

Figure 9:
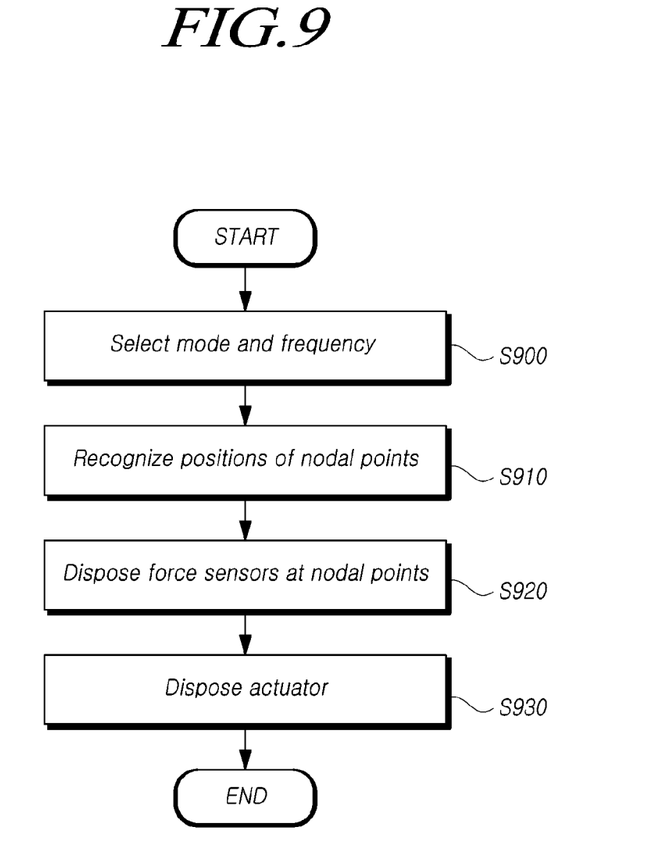
FIG. 9 is a flowchart showing a method for manufacturing a display device according to embodiments of the present disclosure.

FIG. 9 is a flowchart showing a method for manufacturing a display device according to embodiments of the present disclosure.

Referring to FIG. 9, a method for manufacturing a display device may include selecting a mode and a frequency (S900). The selecting of the mode and frequency is intended to select a method for recognizing the positions of the nodal points in the display device, and may be implemented by an experimental method and a structural analysis simulation method. First, the experimental method includes impact hammer nodal testing in which an instantaneous impact is applied directly to the display panel 110 to thus find nodal points, and shaker nodal testing in which a vibration is applied to the display panel 110 to thus find nodal points. The method of finding nodal points through structural analysis simulation includes an analytical method of finding the value of the dominant differential equation representing a deformation-load relationship using the continuum model, and a numerical analysis method in which the values at respective nodes are numerically obtained by solving a matrix equation of a deformation-load relationship using a division model. In addition, the numerical analysis method may include a finite difference method, a finite element method, a boundary element method, mesh-free method, and the like. In addition, a frequency representing a uniform vibration distribution over the entire display panel may be selected. Then, the vibration corresponding to the selected frequency may be transmitted to the display panel, and the positions of the plurality of nodal points may be recognized in the display panel 110 (S910).

Next, force sensors 120 may be disposed at the nodal points (S920). The force sensors 120 may be disposed at all the nodal points in the display panel 110. Alternatively, the force sensors 120 may be disposed at selected optimal nodal points, instead of being disposed at all the nodal points. Since the force sensors 120 are disposed at the nodal points, the force generated by the actuator 130 does not affect the force sensors 120. Accordingly, the force sensors 120 can accurately detect the force generated by a touch. In addition, since the nodal points can be disposed at various positions in the display panel 110, and since the force sensor 120 can be disposed at a position close to a touch point, the force sensor 120 can detect the touch force more accurately.

In addition, a layer may be formed in an area in the nodal area and the non-nodal area, excluding the nodal points in which the force sensors 120 are disposed. The layer may contain a soft material that can be pressed upon application of force. Accordingly, the force sensor 120 may detect the force applied upon a touch by means of the layer without any interference. The lower plate 170 may be disposed under the force sensor 120. The lower plate 170 may support the force sensors 120 such that the force transmitted to the force sensors 120 is concentrated on the force sensors 120. The lower plate 170 supports the force sensors 120, and the force sensors 120 may be pressed by the load of the display panel because the layer 160 includes a soft material. The layer 160 is pressed by the load of the display panel 110, whereas the force sensors 120 are not pressed by the load of the display panel 110. Accordingly, all the loads of the display panel 110 can be transferred to the force sensors 120. Therefore, the force sensors 120 may be more sensitive to the touch force. The lower plate 170 may be supported by the back cover 150. The optimal nodal point may be the position that facilitates the sensing of the touch force, and may be calculated through experiments. In addition, the nodal points may be uniformly distributed over the entire area of the display panel 110, so that the force sensors 120 may be disposed close to a touch point.

The actuator 130 for applying a vibration to the display panel 110 may be disposed on the back surface of the lower plate 170, and may be disposed in the non-nodal area, among the nodal area and the non-nodal area of the display panel 110 (S930). When the actuator 130 is disposed in the nodal area, vibration generated in the actuator 130 may not be effectively transferred to the display panel 110, so that even if the actuator 130 operates, vibration may not be generated in the display panel 110.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A display device comprising:
a display panel including a center portion and an edge portion;
an actuator configured to generate a predetermined vibration that is applied to the display panel;
a force sensor configured to sense force applied onto the display panel, the force sensor disposed on the center portion of the display panel at a nodal point of the display panel that minimizes a portion of the sensed force resulting from the predetermined vibration generated by the actuator;
a plate supporting the force sensor, the plate disposed between the force sensor and the actuator; and
a layer disposed in the center portion and disposed between the display panel and the actuator and on a same plane as the force sensor, and wherein the layer at least partially surrounds the force sensor.

2. The display device of claim 1, wherein the actuator is configured to generate the vibration using a first frequency signal and a second frequency signal, the first frequency signal corresponding to a model type of the nodal point and the second frequency signal having a frequency that is lower than the frequency of the first frequency signal.

3. The display device of claim 1, wherein the display panel comprises a nodal area and a non-nodal area, and wherein the actuator is disposed in the non-nodal area;
wherein the non-nodal area of the display panel is a first area that vibrates due to the predetermined vibration and the nodal area of the display panel is a second area that does not vibrate due to the predetermined vibration.

4. The display device of claim 1, wherein the layer is not overlapped with the nodal point.

5. The display device of claim 1, wherein the layer is made of a material that is configured to compress due to the force applied to the display panel.

6. The display device of claim 1, wherein the layer is made of a material that is softer than a material of the force sensor.

7. The display device of claim 1, wherein the force sensor comprises:
- a first substrate;
- a first electrode on the first substrate;
- a second electrode on the first substrate and spaced apart from the first electrode in a first direction;
- a second substrate over the first electrode and the second electrode; and
- a force electrode on the second substrate and facing towards the first electrode and the second electrode;
- wherein the force electrode is spaced apart from the first electrode and the second electrode in a second direction that is opposite the first direction when force is not applied to the display panel; and
- wherein the force electrode is in contact with the first electrode and the second electrode when force is applied to the display panel.

8. The display device of claim 1, wherein the display panel further comprises:
- a touch sensor configured to sense touch of the display panel, and wherein the actuator generates vibration responsive to the touch sensor sensing the touch.

9. The display device of claim 1, further comprising:
- a cover covering on the display panel;
- a backcover supporting the plate and the cover; and
- a pad disposed between the cover and the backcover.

10. The display device of claim 1, further comprising:
- the force sensor disposed on the edge portion of the display panel at a nodal point of the display panel.

11. A method of manufacturing a display device, the method comprising:
- selecting a mode and a frequency;
- transferring a vibration corresponding to the selected mode and frequency to a display panel including a center portion and an edge portion;
- identifying positions of a plurality of nodal points in the display panel, the plurality of nodal points having minimal vibration relative to other points of the display panel responsive to the transferred vibration;
- disposing a plurality of force sensors at the plurality of nodal points on a center portion of the display panel;
- attaching a plate to the plurality of force sensors, the plurality of force sensors attached to a first side of the plate; and
- forming a layer in the center portion and disposing between the plate and the display panel and on a same plane as the plurality of force sensors, wherein the layer at least partially surrounds the plurality of force sensors.

12. The method of claim 11, wherein selecting the mode and the frequency comprises:
- selecting a method from a plurality of distinct methods to identify the positions of the plurality of nodal points.

13. The method of claim 12, wherein the plurality of distinct methods include an experimental method and a structural analysis simulation method.

14. The method of claim 13, wherein the experimental method includes impact hammer nodal testing comprising:
- applying an impact directly to the display panel using an impact hammer to generate the vibration.

15. The method of claim 14, wherein the experimental method includes shaker modal testing comprising:
- shaking the display panel to generate the vibration.

16. The method of claim 13, wherein the structural analysis simulation method comprises an analytical method of identifying a value of a dominant differential equation representing a deformation-load relation using a continuum model.

17. The method of claim 13, wherein the structural analysis simulation method comprises a numerical analysis method of identifying the plurality of nodal points by solving a matrix equation of a deformation-load relationship using a division model.

18. The method of claim 16, further comprising:
- disposing an actuator that generates a vibration that is applied to the display panel, the actuator disposed on a second surface of the plate that is opposite the first surface of the plate, the actuator disposed in a non-nodal area of the display panel rather than a nodal area of the display panel;
- wherein the non-nodal area of the display panel is a first area that vibrates due to the generated vibration and the nodal area of the display panel is a second area that does not vibrate due to the predetermined vibration.

* * * * *